United States Patent [19]

Wolf

[11] 4,188,428
[45] Feb. 12, 1980

[54] BOARD ELEMENT

[76] Inventor: Peter Wolf, Am Galgenfeld 13, 6460 Gelnhausen, Fed. Rep. of Germany

[21] Appl. No.: 889,850

[22] Filed: Mar. 24, 1978

[30] Foreign Application Priority Data

Aug. 16, 1977 [DE] Fed. Rep. of Germany ....... 2736842

[51] Int. Cl.² .................. B32B 3/00; B32B 31/10
[52] U.S. Cl. .................. 428/71; 156/245; 273/70; 428/157; 428/159; 428/160; 428/315
[58] Field of Search .......... 273/30, 95 H; 428/71, 428/76, 158, 159, 160, 166, 167, 174, 175, 178, 157, 256, 313, 322, 315; 264/255, 321; 156/245

[56] References Cited

U.S. PATENT DOCUMENTS

| | | | |
|---|---|---|---|
| 3,000,144 | 9/1961 | Kitson | 52/311 |
| 3,222,697 | 12/1965 | Scheermesser | 428/160 |
| 3,387,420 | 6/1968 | Long | 428/167 |
| 3,755,031 | 8/1973 | Hoffman et al. | 428/167 |
| 3,791,912 | 2/1974 | Allard | 428/313 |
| 3,841,958 | 10/1974 | Delorme | 428/322 |
| 4,070,719 | 1/1978 | Morgan | 428/167 |

Primary Examiner—William J. Van Balen
Attorney, Agent, or Firm—Larson, Taylor and Hinds

[57] ABSTRACT

A lightweight board element includes a lightweight core, such as rigid plastic foam, and a covering layer such as glass fiber-reinforced resin. The upper and lower surfaces of the core are provided with a grid pattern made of up narrow grooves for improving stiffness and surface strength. The lower surface is provided with a further grid pattern of wider grooves which offer improved resistance to distortion. The cover layer is bonded to the core in a mold and the cover layer extends over the side edges of the core. The board uses relatively inexpensive materials and has excellent properties. The board element is particularly suited to the fabrication of a table tennis table in which case the grid pattern of narrow grooves in the upper core surface provides excellent ball bounce characteristics.

9 Claims, 3 Drawing Figures

BOARD ELEMENT

BACKGROUND OF THE INVENTION

The invention relates to a board element comprising a lightweight core and a cover layer of glass fiber-reinforced resin. In particular, the invention relates to a lightweight board element of high strength and stiffness. Such board elements find particular use in fabrication of table tennis tables, solar collectors, recreational vehicles, housing and other applications where strong, lightweight board members are used.

Lightweight board elements have been previously described. For instance, a lightweight board element is described in German Auslegeschrift No. 1,303,270. The core in that case comprises corrugated paper honeycomb.

There are no technical difficulties in production of non-warping weatherproof, decomposition-resistant board of this kind, if expense is of no importance. Technical problems arise only if the attempt is made to produce such board with the least possible use of material and using inexpensive materials. In composite construction, wherein a sandwich construction, a core of light inexpensive material is combined with cover layers of glass fiber-reinforced polyester resin, the problem is to minimize the proportion by weight of the relatively expensive covering layers.

Further, in respect to manufacturing cost, the board should be constructed in such a way that it will be possible to join the cover layers directly to the core in a single step before the cover layers harden and not in such a way that the prefabricated layers would have to be formed and subsequently bonded together. Finally, in the case of table tennis board, in addition to being weatherproof and true to form, the bounce of the ball on the board is important. Normally, light materials offer poor bouncing and playing properties.

In the case of solar collectors, on the other hand, it is essential that the absorbed thermal energy from the light rays not be lost by thermal conduction to the substructure. Board elements are needed therefore that are as rigid and stable as possible, and on the other hand, provide good insulation so that the absorbed thermal energy, instead of being carried off through the panel, will be efficiently taken up by the fluid used for heat transport, and carried off to be utilized.

It is therefore an object of the invention to provide a board element of the specified type which, in spite of a lower proportion of glass fiber reinforced polyester resin, will be stronger and retain its form better than known boards.

BRIEF SUMMARY OF THE INVENTION

The foregoing object and others that will be apparent to those having ordinary skill in the art are achieved according to the present invention in that the core of the board element comprises a plate of rigid polyurethane foam, provided on its under side with longitudinal and transverse grooves, and in that its cover layers extend out around and thereby cover the sides of the core.

DETAILED DESCRIPTION

Rigid polyurethane foam, like corrugated paper honeycomb, has the property that with simultaneous application of the still unhardened glass fiber-reinforced polyester resin of the cover layers, by means of upper and lower mold plates, there is an intimate joining between core and cover layers. However, much less polyester resin is needed because not so much of it will penetrate into the internal cavities of the core as in the case of corrugated paper honeycomb. This is particularly to be noticed at the edge. For this reason, the edge - in known board - is formed by a special shaped piece, which is associated with the special disadvantage that the cover layer is first made extending outward over the edge and then has to be trimmed above and below. On the other hand, in accordance with the present invention, the core consists of hard polyurethane foam, and the side walls of the board are covered with a layer that is the same as the layers on the top and bottom of the board. There is no need for a special edge piece. Here there is the manufacturing advantage that the edge cover can be made with the upper and lower covering layers in a single molding process. In use of a mold whose halves cooperate like a cylinder-piston unit, whereby the side walls of the board are shaped exactly to measure by the side walls of the cylindrical mold halves, at the edges of the board there is formed, at the most, a small burr that can be easily polished off quickly after the resin hardens.

It has unexpectedly been found, in accordance with the present invention, that a great deal of polyester resin can be saved if the hard polyurethane foam core is provided with longitudinal and transverse grooves. The favorable effect of these grooves can presumably be attributed in part to the fact that in compression of the core with the viscous polyester resin cover layers, the glass fibers embedded therein press like arcs into the grooves. In any event, outstanding properties are achieved at low cost with a surprisingly small quantity of resin.

Normally, a relatively thick covering layer of polyester resin is needed on the upper side of a table tennis board so that the tennis ball will bounce as it would on a wooden table. It has been found in accordance with the present invention that the bounce properties are correspondingly better if, in addition to relatively wide grooves (about 6–12 mm wide, 3–6 mm deep) on the underside of the core, its upper and under side are provided with a rectangular pattern formed by relatively narrower grooves about 1 or 2 mm wide and 3 to 6 mm deep. These grooves, in a preferred embodiment, are about 1 mm wide and receive only minimal quantities of polyester resin. It is practically of no importance in the cost aspect, if these grooves are provided not only on the top but for the sake of uniform structuring above and below to get better form stability, also on the under side. The narrow grooves are so close to each other that the bouncing of the ball on all locations on the board is equally good.

Finally, the grooves also have the advantage that, within limits, they can take up fluctuating amounts of polyester resin. This is important, to the extent that such fluctuations are practically unavoidable in application of the polyester resin on the mold halves. Because the overall dimensions of the table tennis boards have to be respected with precision and are predetermined by the mold, the polyester resin that is applied in a certain excess for reasons of safety, if it could not be taken up by the core, would be forced out of the mold and would involve various bothersome diadvantages. Also, an unequal take-up of the excess material in the core would be problematical, in consideration of the uniform properties over the surface.

There are difficulties, in the case of a board consisting of a light core and thin covering layers, in fixing on a frame or connecting with other parts. The fastening points must not lead to localized irregularities either. Moreover, the rigid foam insert offers no firm hold, so that an attachment readily breaks out. The solution for this problem was unexpectedly found in association with the invention, by inclusion in the polyester resin of pieces of wire fabric applied to the core at those places in the board where fastening screws have to be screwed in. Good hold in this case is apparently attributable to the fact that the liquid polyester resin penetrates into the meshes and openings of the wire fabric.

The white border of the field of play of table tennis boards has heretofore been added by subsequently painting it on. In a preferred embodiment of a table tennis board of the invention, differently pigmented polyester resin layers are superimposed in appropriate places. First, white pigmented polyester resin is applied to the edge zone of the mold half that forms the upper side of the board, and then green pigmented polyester resin is painted over the whole surface of the mold half, after gelatin of the white pigmented resin. The white border strip thus obtained is much more durable than the paint coating that has been customary heretofore.

The invention will be discussed in more detail below, with reference to the drawings.

Figure 1:
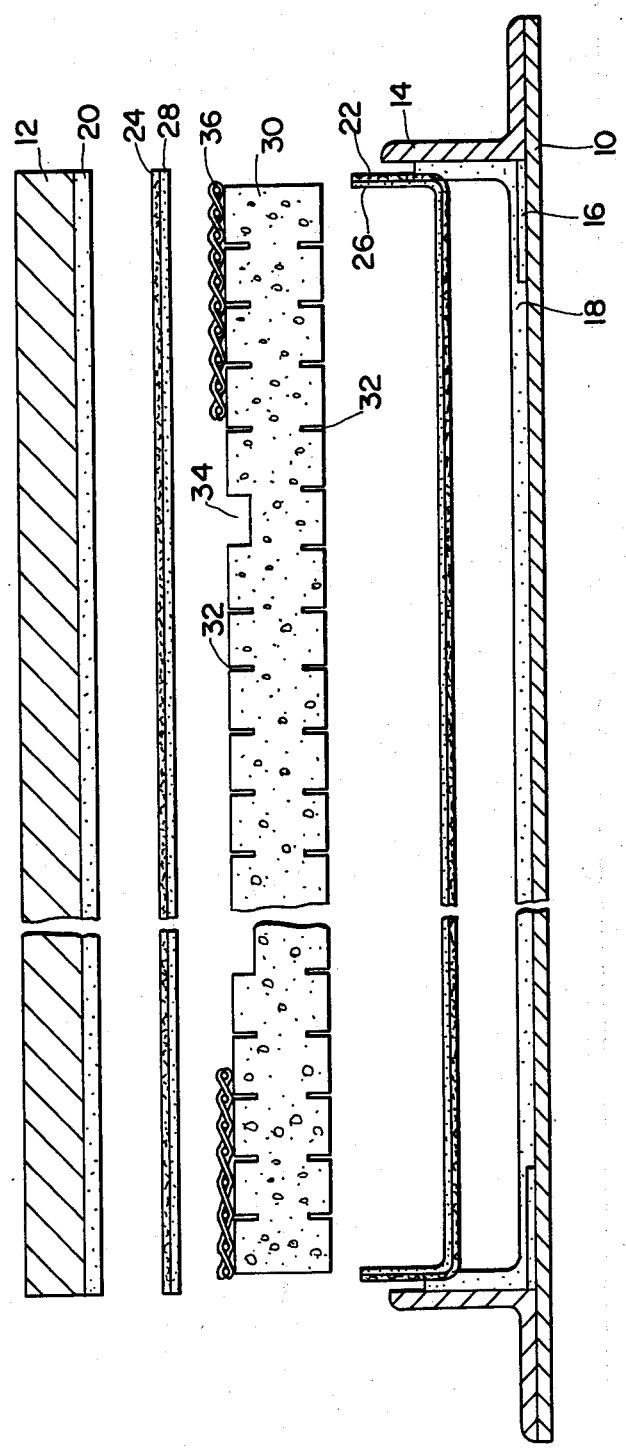
FIG. 1 shows the different layers of a board element according to the invention, in an exploded view, for the sake of a better comprehension of the manufacturing process.
Figure 2:
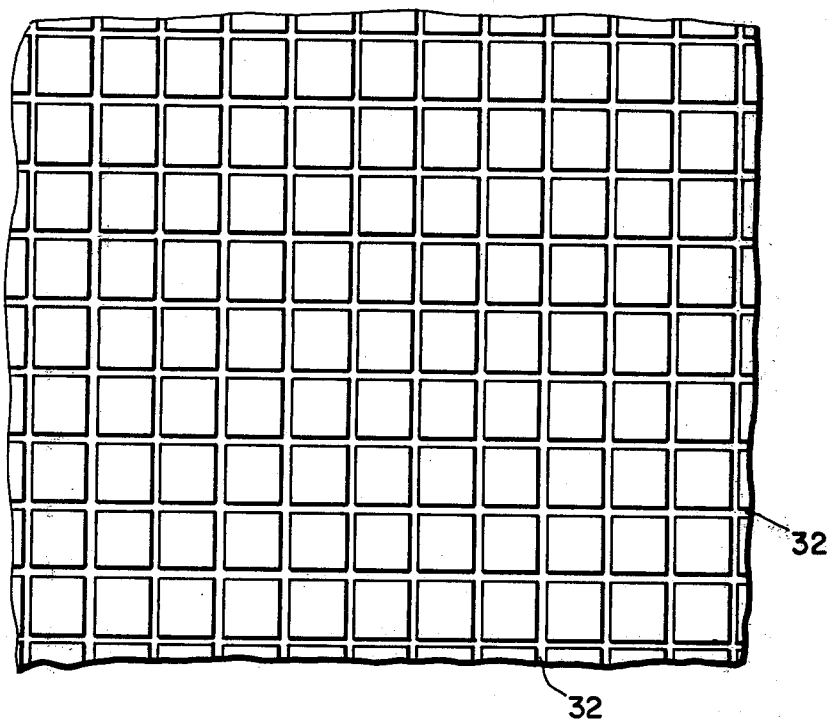
FIG. 2 is a diagrammatic plan view of a small portion of the top surface of a board element showing a grid pattern of the narrow grooves.
Figure 3:
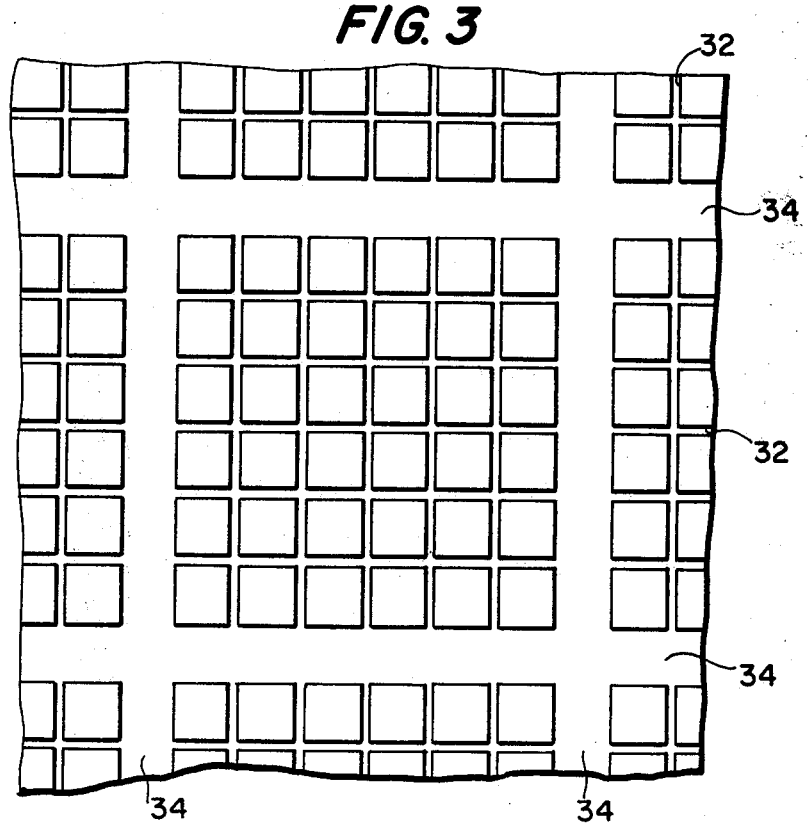
FIG. 3 is a diagrammatic bottom view of a small portion of the bottom surface of a board element showing a grid pattern of narrow grooves and a grid pattern of wide grooves.

For production of the board element, a mold comprising halves 10 and 12 is used. The mold has the exact dimensions of the finished board element. Mold half 10 has side walls 14 corresponding to the outline of the board element, which shape the sides of the board. Mold half 12 fits precisely between side walls 14, like a piston in its cylinder.

In production of a table tennis board, a white pigmented strip 16 of polyester resin, corresponding to the white border that defines the field of play on the table tennis board, is applied to mold half 10. In order to get straight lines, the other surfaces of mold half 10 or at least those that are adjacent can be taped over beforehand. The white pigmented polyester resin is than allowed to gel, the previously taped over surfaces are bared again, and green pigmented polyester resin is painted in a layer 18 on mold half 10. The white polyester resin coating can be coated over by layer 18 as shown in the drawing and layer 18 can also be coated adjacent side walls 18 as shown such that the side walls of the board to be formed will be covered.

Mold half 12 is provided with a green pigmented polyester resin coating 20. Both layers 18 and 20 are allowed to gel before layers of glass fibers 22 and 24 respectively are laid on the two mold halves, so that the resin will not pass through to the outside, through the layers of polyester resin. Additional layers 26, 28 are applied, respectively, to glass fiber mats 22, 26 and the resin is permitted to saturate into and coat the mat such as by pressing the resin with a roller such that the mats became saturated with resin. As illustrated, the side walls 14 of mold half 10 are also treated like the base surface by application of layers 18, 22, 26, so that later the glass fiber reinforced polyester resin layer will cover the sides of the finished board.

After the above-described preparation of the two mold halves 10 and 12, a core 30, consisting of rigid polyurethane foam, is laid in mold half 12. Mold half 12 is then turned and pressed with its upper side downward on core 30 so that all the abovementioned layers together with core 30 will constitute a solid unit.

The grooves 32 extend across from each edge of the board (i.e. a rectilinear board) to the opposite edge and intersect one another to form a grid pattern. A series of parallel grooves (referred to for convenience as "longitudinal" grooves) thus extends in one direction across the surface of the core 30 and another series of parallel grooves (referred to for convenience as "transverse" grooves) extends in another direction across the surface of the board such that the grooves intersect. The grid pattern is preferably rectangular and may be square as shown. On the other hand, the grid pattern may be non-rectangular in which case the grooves intersect at an angle of less than 90°, preferably not less than about 40°. Each groove 32 preferably has a depth of about 3–6 mm, a width of about 1–3 mm, and the distance between grooves is preferably about 0.5–1.5 cm. In a particular embodiment for a board element for a table tennis table, the narrow grooves 32 have a width of 2 mm, a depth of 4 mm and the parallel grooves are spaced 1 cm apart from one another. Therefore, the intersecting grid pattern forms a plurality of squares of 1 $cm^2$ area surrounded by the narrow grooves. Narrow grooves 32 are provided on both the upper and lower surface of rigid plastic foam core 30 in any convenient manner such as by cutting a pre-formed rigid foam element and provide stiffness and surface strength in a board element according to the invention. Narrow grooves 32 also provide improved ball bounce characteristics where the board element is utilized in a table tennis table in accordance with the invention.

In addition to the grid pattern of narrow grooves 32, the lower surface of core 30 is also provided with a grid pattern of relatively wide grooves 34 which serve to stiffen the board element against distortion. The surface of a table tennis table or other board element, if exposed to sunlight, can become very hot (e.g. 70° C.) on the upper side which is exposed to sunlight. This tends to distort the table surface. Wide grooves 34 provided in the lower surface of core 30 resist such distortion. As in the case of narrow grooves 32, a series of parallel wide grooves ("longitudinal" grooves) extends in one direction across the core surface and another series of grooves ("transverse" grooves) extends in another direction such that the grooves intersect. The grid pattern may be rectilinear or at an angle, preferably not less than 45°, as in the case of the narrow grooves. Each wide groove 34 preferably has a depth of about 3–6 mm, a width of about 6–12 mm, and the parallel grooves are separated by a distance of about 15–20 cm. In general, the core thickness is about 12–25 mm in thickness and, for a table tennis table, preferably 14–20 mm in thickness.

The system of grooves on the upper and lower surfaces of core 30 can (within limits) accept different amounts of the polyester resin when it is applied, so that quantitative fluctuations that occur in practice in application of polyester resin layers 26 and 28 are of no consequence. In the course of compression of the mold, the polyester resin that at the beginning still has good rheological properties is distributed equally in the grooves and on the surfaces of core 30. The thickness of the polyester resin layer at the side edges of the core is determined according to the gap between side walls 14 of mold halves 10 with respect to the length or width of the board-shaped core 30. The distance between opposed side walls 14 can be for example 6 mm larger than the width of core 30 in which case the side edge thickness is 3 mm. A side edge thickness of 2–6 mm is preferred.

If the board element of the invention is to be screwed onto an under-structure, a frame or the like, it is important that the screws have a secure hold in the board. For this purpose, at the places in question, where screws are to be screwed in later, wire fabric 36 can be laid on the core. The wire fabric will be enclosed by the polyester resin when mold halves 10, 12 are pressed together - in the example, in layer 28 - and will present a secure hold for screws. For screws with a rated diameter of 4 mm, a fabric mesh is recommended that has a wire thickness of 3 mm and a mesh width of 2 mm.

Use of the grooved rigid polyurethane foam board of the invention as a core allows a shaped edge construction of the board with only a small amount of polyester resin material for the side edges of the element. By the described grooving of the core, the needed strength is obtained, as well as the desired playing properties, with a minimum quantity of polyester resin. Polyester resin layers of the order of magnitude of 700 g/m$^2$ are suitable, for instance, and glass fiber mats of 300 g/m$^2$. Without the grooves, the layers would have to be substantially thicker, and more expensive. Preferably, the resin layer does not exceed 1200 g/m$^2$ and still more preferably it does not exceed 1000 g/m$^2$. The glass fiber weight preferably does not exceed 500 g/m$^2$ and more preferably it does not exceed 400 g/m$^2$. The minimum amounts of these materials will vary but in general will be about 400 g/m$^2$ of resin and about 200 g/m$^2$ of glass fiber.

Core 30 is preferably a conventional rigid foam plastic material preferably having a density of about 40 to 70 kg/m$^3$, more preferably about 50 to 60 kg/m$^3$ and a compression strength of at least about 3 kg/cm$^2$. The foam is preferably of the closed cell type to enhance resistance to weather and decomposition.

It is to be understood that instead of a grid pattern formed of longitudinal and transverse or some other sort of grooves a pattern of craters or blind holes could be used which could be situated e.g. where else the points of intersection of the grooves would be and which could have the same or a greater depth than mentioned above.

It is further to be understood that instead of the materials described other materials, e.g. epoxy resins for the covering layers, another hard foam for the core or other fibers, can be used. Such materials are well known in the art. Selection of particular materials is mainly a question of price relations which may change with time.

What concerns the mating of the wire mesh and the screws it is generally recommended that the mesh width is about the same or a little bit smaller than the core of the screws. The wire mesh could also cooperate with other fixture or attachment elements like e.g. rivets.

The proposal of extending the covering layer over the side edges of the core of the board element and forming the outer layer of the side edges simultaneously with the covering layer naturally can be used in connection with all sorts of patterns of grooves or craters.

What is claimed is:

1. A lightweight board element comprising a lightweight core having a plurality of cellular cavities and a covering layer provided on the upper and lower surfaces of the core, said layer comprising synthetic resin and resin-impregnated glass fiber mat coextensive with the core, and further comprising wire fabric embedded in said synthetic resin covering layer for receiving fastening screws, said core comprising a rigid plastic foam board-like element having a first grid pattern of intersecting grooves on its upper surface and a second grid pattern of intersecting grooves on its lower surface, the first and second grid patterns being formed in the respective upper and lower surfaces of the core and being separated from one another, each of said first and second grid patterns being formed by a series of longitudinal and transverse grooves extending across the respective upper and lower surface of the core, each of said grooves having a width of about 1 to 3 mm, a depth of about 3–6 mm, and being separated by a distance of about 0.5 to 1.5 cm, said longitudinal and transverse grooves intersecting and forming said grid patterns.

2. An improved lightweight board element according to claim 1 wherein said covering layer extends over and covers the side edges of said core.

3. An improved lightweight board element according to claim 1 wherein said second grid pattern on the lower surface of said core comprises a series of wide longitudinal and transverse grooves in addition to the grid pattern formed thereon by said narrow grooves, said wide grooves having a width of about 6–12 mm and a depth of about 3–6 mm.

4. An improved lightweight board element according to claim 3 wherein said wide parallel grooves are separated by a distance of about 15–20 cm.

5. An improved lightweight board element according to claim 4 wherein said grid patterns are rectilinear.

6. An improved lightweight board element according to claim 1 wherein said core comprises rigid polyurethane resin foam.

7. An improved lightweight board element according to claim 1 wherein said cover layer comprises polyester resin.

8. An improved lightweight board element according to claim 1 wherein said cover layer comprises a plurality of regions of differently pigmented resin.

9. A method of making a lightweight board element comprising the steps of
providing a first mold half having a peripheral side wall and a bottom wall;
providing a second mold half engageable with said first mold half to form a board-shaped mold cavity;
providing first layers of curable synthetic resin adjacent the mold surfaces of said first and second mold halves, such that the resin covers the mold surfaces including said peripheral side wall;
curing said first layer of synthetic resin;
providing a layer of glass fiber adjacent the cured first layer of resin such that the layer of glass fiber covers the cured resin layer including the resin layer on said peripheral side wall;

coating a second layer of curable synthetic resin on said layer of glass fiber such that the resin penetrates into and saturates the glass fiber;

locating a lightweight rigid plastic foam core between the mold halves;

pressing the mold halves together to contact the core and the glass fiber layers saturated with said second layer of curable synthetic resin; and curing said second layer of curable synthetic resin to bond said core thereto to form a unitary board element, said core having a grid pattern on its upper and lower surfaces, said grid pattern being formed by a series of longitudinal and transverse grooves extending across the upper and lower surfaces of the core, said grooves intersecting and forming said grid pattern.

* * * * *